(12) United States Patent
Doppler et al.

(10) Patent No.: US 7,983,302 B2
(45) Date of Patent: Jul. 19, 2011

(54) CONTROL SIGNALING TECHNIQUES FOR WIRELESS NETWORKS

(75) Inventors: Klaus Doppler, Espoo (FI); Lars Lindh, Helsinki (FI)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 11/935,268

(22) Filed: Nov. 5, 2007

(65) Prior Publication Data
US 2009/0067362 A1    Mar. 12, 2009

Related U.S. Application Data

(60) Provisional application No. 60/864,704, filed on Nov. 7, 2006.

(51) Int. Cl.
*H04L 12/50* (2006.01)
(52) U.S. Cl. .......................... 370/473; 370/442
(58) Field of Classification Search .................. 370/473, 370/442, 310.2, 314, 321, 322, 329, 332
See application file for complete search history.

(56) References Cited

U.S. PATENT DOCUMENTS

| | | | |
|---|---|---|---|
| 6,516,184 B1 * | 2/2003 | Damgaard et al. | 455/86 |
| 7,116,983 B2 * | 10/2006 | Lan et al. | 455/452.2 |
| 7,440,422 B1 * | 10/2008 | Holma et al. | 370/278 |
| 7,519,011 B2 * | 4/2009 | Petrus et al. | 370/280 |

FOREIGN PATENT DOCUMENTS

| | | |
|---|---|---|
| EP | 1701490 | 9/2006 |
| JP | 188790 | 5/1986 |
| WO | 2005083920 | 9/2005 |
| WO | 2006045499 | 5/2006 |

OTHER PUBLICATIONS

Tong, Wen et al, "Enhancing MIMO Features for OFDMA PHY Layer", IEEE 802.16 Broadband Wireless Access Working Group, IEEE 802.16e-04/81; Nortel Networks Ontario, Canada, (Apr. 25, 2004),1-9.
Dinan, Esmael et al., "High-Speed Packet Access Technologies for UMTS Networks", Bechtel Telecommunications Technical Journal, Jun. 2006, vol. 4 No. 2, (2006),1-7.
Chang, Youngbin et al., "Frame Structure for Multi-Hop Relay", IEEE 802.16 Broadband Wireless Access Working Group; IEEE C802.16j-06/xx, (Nov. 7, 2006),1-9.
Comstock, David et al., "A Flexible Multi-Hop Frame Structure for IEEE 802.16j", Huawei Technologies, (Oct. 25, 2006),1-7.
ISR, "International Search Report and Written Opinion", Issued in PCT International Application No. PCT/IB/2007/003380, (May 13, 2008),1-11.
"Part 11: Wreless LAN Medium Access Control (MAC) and Physical Layer (PHY) Specifications", IEEE Std 802.11-1999 (Reaff 2003), (2003),1-716.

* cited by examiner

*Primary Examiner* — Brenda Pham
(74) *Attorney, Agent, or Firm* — Brake Hughes Bellermann LLP

(57) ABSTRACT

Various example embodiments are disclosed relating to wireless networks, such as relay networks or multi-hop networks, and also relating to control signaling techniques for wireless networks. In an example embodiment, a method or technique may include transmitting (e.g., data or control) frames in a downlink direction and control frames in an uplink direction during a first phase, and transmitting (e.g., data or control) frames in an uplink direction and control frames in a downlink direction during a second phase.

10 Claims, 12 Drawing Sheets

CONTROL SIGNALING TECHNIQUES FOR WIRELESS NETWORKS

CROSS-REFERENCE TO RELATED APPLICATIONS

This application claims priority based on U.S. Provisional Application No. 60/864,704, filed on Nov. 7, 2006, entitled, "Control Signaling Techniques for Wireless Networks," the disclosure of which is hereby incorporated by reference.

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. Other wireless technologies are being developed, such as IEEE 802.16 or WiMAX technology, etc.

As an example, a wireless relay network may include a multi-hop system in which end nodes such as mobile stations (MSs) or mobile nodes (MNs) may be coupled to an Access Gateway (AG) (also known as Access Point or Base Station) via one or more relay nodes (RNs) (also known as relay stations (RSs)). Thus, traffic between MNs and the AG may pass through and/or be processed by the RNs. However, such a relay network may typically include multiple hops between an AG and a MN, which may in some cases introduce significant latency or delay for communications.

Techniques are desirable that may decrease latency or delay for wireless networks, such as for multi-hop or relay networks.

SUMMARY

Various example embodiments are disclosed relating to relay networks or multi-hop networks, and also relating to control signaling techniques for wireless networks.

In an example embodiment, a method of transmitting data may include transmitting a data frame to a first node and a control frame to a second node during a first phase of a multi-phase operation, wherein the control frame is transmitted to the second node using a dedicated control channel.

In another example embodiment, a method of transmitting data using a multi-phase operation may include transmitting frames in a downlink direction and control frames in an uplink direction during a first phase, and transmitting frames in an uplink direction and control frames in a downlink direction during a second phase.

In another example embodiment, a method of transmitting and receiving data using a multi-phase operation may include transmitting at least data frames in a downlink direction and control frames in an uplink direction during a first phase, receiving frames in an uplink direction during a second phase, receiving frames in a downlink direction during a third phase, and transmitting at least data frames in an uplink direction and control frames in a downlink direction during a fourth phase.

In another example embodiment, a method may include transmitting at least data frames in a first direction and control frames in a second direction, as needed, during a first phase, and transmitting at least data frames in a second direction and control frames in a first direction, as needed, during a second phase.

In another example embodiment, a method may include performing the following by a first group of wireless nodes in a relay network: transmitting at least data frames in a first direction and control frames in a second direction during a first phase, and transmitting at least data frames in the second direction and control frames in the first direction during a fourth phase; and performing the following by a second group of wireless nodes in a relay network: transmitting at least data frames in the second direction and control frames in the first direction during a second phase; and transmitting at least data frames in a first direction and control frames in a second direction during a third phase.

In another example embodiment, an apparatus (e.g., a relay node) for wireless communication is provided, the apparatus configured to: transmit frames in a downlink direction and control frames in an uplink direction during a first phase; and transmit frames in an uplink direction and control frames in a downlink direction during a second phase. In an example embodiment, the apparatus may be a relay node, the relay node further including a controller, a memory and a wireless transceiver.

In another example embodiment, an apparatus for wireless communications may include a controller, a memory coupled to the controller, and a wireless transceiver coupled to the controller. The apparatus may be configured to transmit at least data frames in a first direction and control frames in a second direction during a first phase; receive frames in the second direction during a second phase; receive frames in the first direction during a third phase; and transmit at least data frames in the second direction and control frames in the first direction during a fourth phase.

In an example embodiment, the first direction may be a downlink direction and the second direction may be an uplink direction. In another example embodiment, the second direction may be a downlink direction and the first direction may be an uplink direction.

In yet another example embodiment, an apparatus may include a first group of wireless nodes including one or more nodes, wherein the first group of wireless nodes is configured to: transmit at least data frames in a first direction and control frames in a second direction during a first phase; and transmit at least data frames in the second direction and control frames in the first direction during a fourth phase; and a second group of wireless nodes including one or more nodes, wherein the second group of wireless nodes is configured to: transmit at least data frames in the second direction and control frames in the first direction during a second phase; and transmit at least data frames in a first direction and control frames in a second direction during a third phase.

In an example embodiment, the first group of wireless nodes may include one or more relay nodes at a first level of a network, and the second group of wireless nodes may include one or more relay nodes at a second level of a network.

In yet another example embodiment, a relay node may be provided. The relay node may be configured to operate in an access radio network for wireless media coupling one or more mobile nodes and the relay node. The relay node may also be configured to operate in a mesh radio network for wireless media coupling the relay node to an access node or one or more other relay nodes, the wireless media for the access radio network being substantially orthogonal to the wireless media for the mesh radio network, the relay node further configured to: transmit frames in a downlink direction and control frames in an uplink direction during a first phase, and transmit frames in an uplink direction and control frames in a downlink direction during a second phase.

The details of one or more implementations are set forth in the accompanying drawings and the description below. Other features will be apparent from the description and drawings.

DETAILED DESCRIPTION

Figure 1:
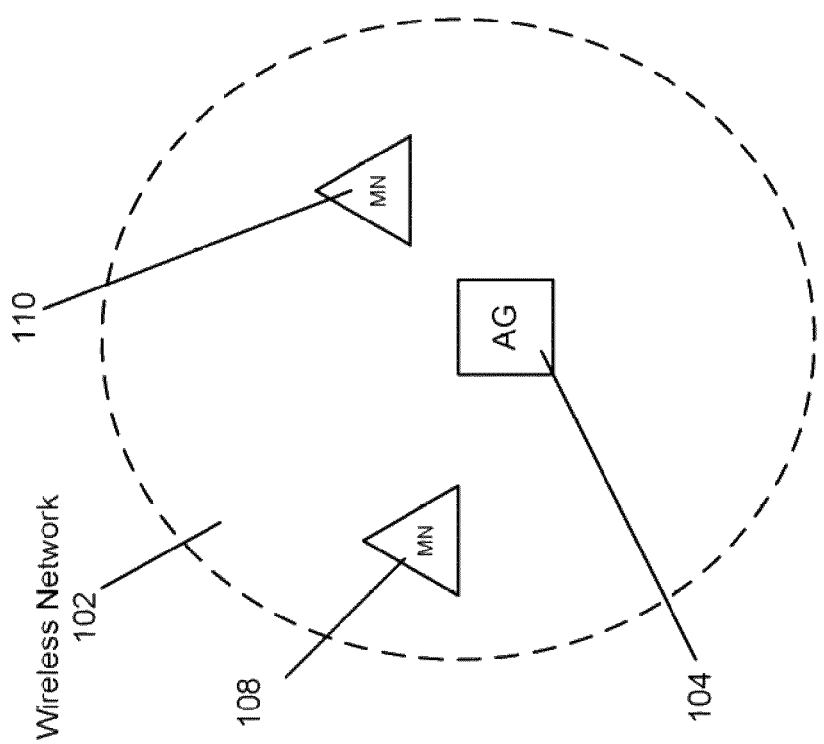
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as an access gateway (AG) 104 (or base station or access point) and one or more mobile stations or mobile nodes (MNs), such as MNs 108 and 110. While only one AG and two mobile nodes are shown in wireless network 102, any number of AGs and mobile nodes may be provided. Each node in network 102 (e.g., MNs 108, 110) may be in wireless communication with the AG 104, and may even be in direct communication with each other. Although not shown, AG 104 may be coupled to a fixed network, such as a Local Area Network (LAN), Wide Area Network (WAN), the Internet, etc., and may also be coupled to other wireless networks.

Although not shown in FIG. 1, in an example embodiment, one or more relay nodes or relay stations may also be provided in wireless network 102, e.g., to improve wireless coverage or data throughput. A wireless relay network may be an example of a multi-hop system in which end nodes, for example, mobile nodes (MNs) or mobile stations may be coupled to an access gateway (AG) or base station via one or more relay nodes (RNs) or relay stations.

Figure 2:
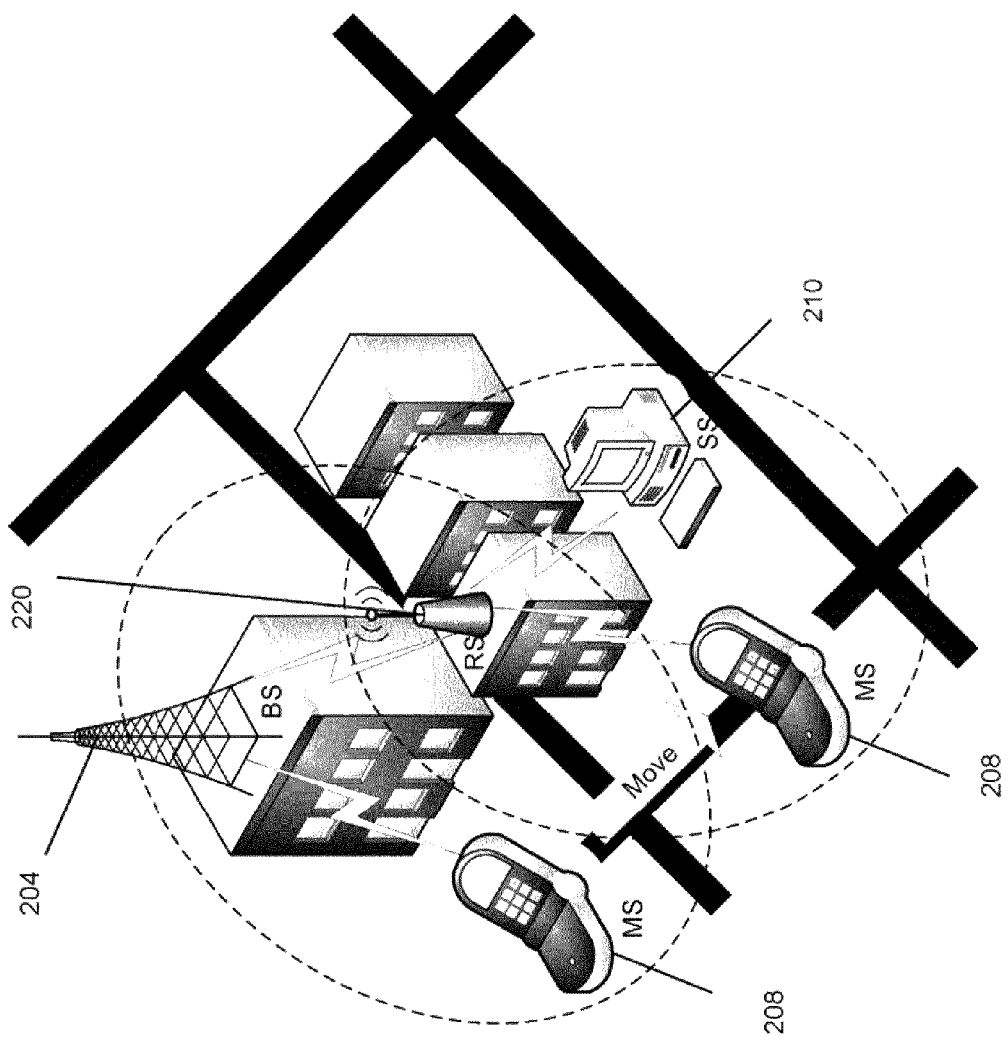
FIG. 2 is a block diagram illustrating a wireless network according to an example embodiment.

FIG. 2 is a block diagram illustrating a wireless network according to an example embodiment. According to an example embodiment, a mobile station (or mobile node) MS 208 may initially communicate directly with a base station BS (or AG) 204, for example, and a subscriber station (or other MN) 210 may communicate with the base station BS 204 via a relay station RS (or relay node) 220. In an example embodiment, the mobile station 208 may travel or move with respect to base station BS 204. For example, the mobile station MS 208 may move out of range of the base station BS 204, and may thus begin communicating with the base station 204 via the relay station 220 as shown in FIG. 2.

Figure 3:
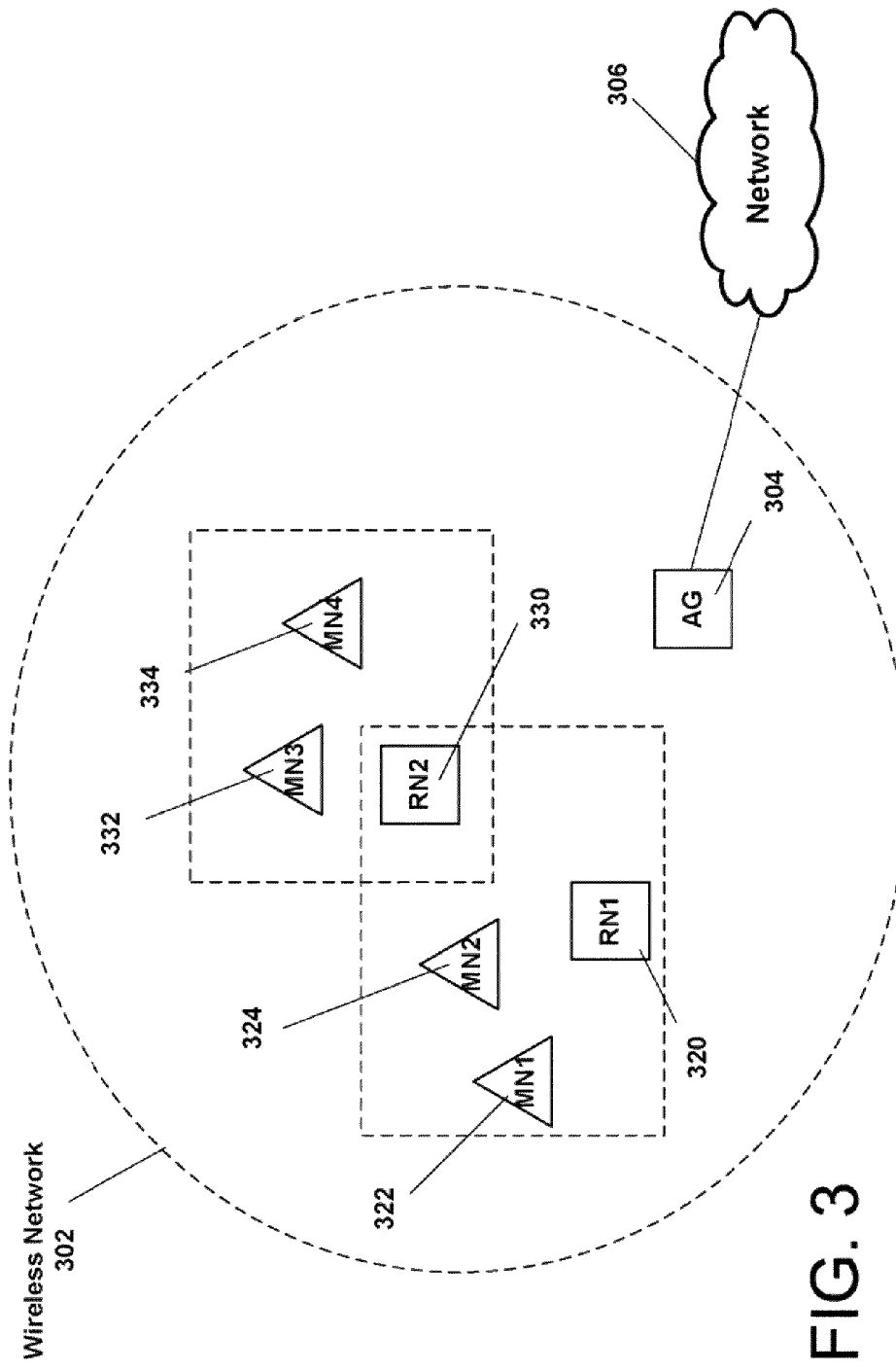
FIG. 3 is a block diagram illustrating a wireless network according to an example embodiment.

FIG. 3 is a block diagram illustrating a wireless network 302 according to an example embodiment. Wireless network 302 may include a number of wireless nodes or stations, such as an access gateway (AG) 304, relay nodes RN1 320 and RN2 330, a group of mobile nodes, such as MN1 322 and MN2 324 communicating with relay node RN1 320, and mobile nodes MN3 332 and MN4 334 communicating with relay node RN2 330. In an example embodiment, relay node RN2 330 may also communicate with relay node RN1 320. While only one AG, two RNs, and four MNs are shown in wireless network 302, any number may be provided. AG 304 may be coupled to a fixed network 306, such as a Wide Area Network (WAN), the Internet, etc., and may also be coupled to other wireless networks. The group of nodes MN1 322, MN2 324, and RN2 330 may communicate with the AG 304 via the relay node RN1 320. The group of nodes MN3 332, MN4 334, may communicate with AG 304 via the relay node RN2 330, which may, for example, communicate with the AG 304 via the relay node RN1 320, for example. Wireless network 302 may be an example of a relay network or multi-hop network.

In an example embodiment, the mobile nodes 322, 324, 332, 334 in FIG. 3 may include, for example, mobile telephones, cell phones, WLAN or WIMAX phones, wireless personal digital assistants (PDAs), or other types of wireless devices, or mobile stations/nodes. The AG may refer to an access gateway, base station, access point or similar device, and may be coupled to a wired network such as the Internet. The relay nodes (e.g., RN1, RN2) may include, for example, wireless nodes coupled between an AG (or other RN) and one or more mobile nodes, or between two RNs. In some cases, there may be, for example, several RNs coupled in series between a MN and an AG, for example.

The various example embodiments described herein may be applicable to a wide variety of example networks and technologies, such as WLAN networks (e.g., IEEE 802.11 type networks), IEEE 802.16 WiMAX networks, relay networks, 802.16 Mobile Multi-hop Relay (MMR) networks, as referenced in IEEE 802.16 WG, WiMedia networks, Ultra Wide Band networks, cellular networks, radio networks, or other wireless networks. In another example embodiment, the various examples and embodiments may be applied, for example, to a mesh wireless network, where a plurality of mesh points may be coupled together via wired or wireless links. The various example embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

Figure 4:
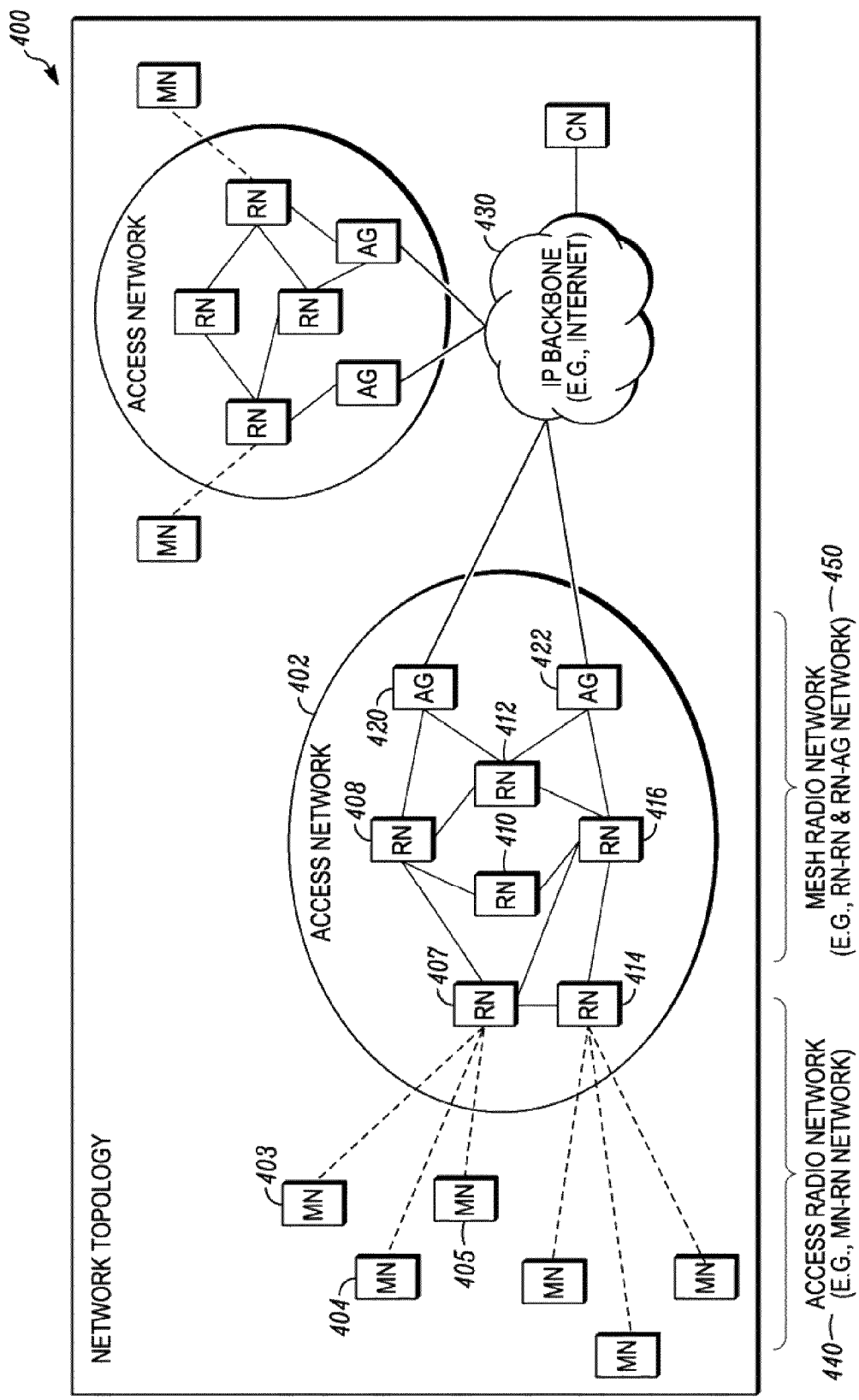
FIG. 4 is a diagram illustrating a relay network according to an example embodiment.

FIG. 4 is a diagram illustrating a relay network 400 according to an example embodiment. As shown in the example of FIG. 4, one or more mobile nodes (MNs) are coupled to an IP (e.g., Internet Protocol) backbone 430 (such as the Internet) via an access network 402. Access network 402 may include, for example, one or more relay nodes (RNs) and one or more access gateways (AGs). For example, mobile nodes (MNs) 403, 404 and 405 are directly coupled (e.g., wirelessly) to RN 407. One or more, or even a mesh of relay nodes, such as RNs 408, 410, 412, 414, 416, etc., may be provided to allow MNs 403-405 to communicate with AGs 420 or 422, for example.

According to an example embodiment, the network topology or relay network 400 illustrated in FIG. 4 may be considered to include an access radio network 440 and a mesh radio network 450. The access radio network 440 may include the MN-RN and AG-MN wireless interface or wireless media between mobile nodes (MN) 403, 404, 405, etc. and one or more relay nodes (RNs). A mesh radio network 450 may include the RN-RN and RN-AG wireless interface or wireless media, such as the wireless media for RNs to communicate with other RNs, and RNs to communicate with AGs.

According to an example embodiment, the wireless media (which may include one or more channels) of access radio network 440 may, for example, be separate or orthogonal from the wireless media for mesh radio network 450. Orthogonality between the two networks may be accomplished by using different channels (e.g., different channels or frequencies, different time slots, and/or different frequency hopping sequences, etc), for instance. For example, if OFDM (Orthogonal Frequency Division Multiplexing) is used, different sets of frequencies or subcarriers may be used for access radio network 440 and mesh radio network 450. Or, for example, if OFDMA (Orthogonal Frequency Division Multiple Access) is used, then different frequencies (or subcarriers) and/or time slots may be used between access radio network 440 and mesh radio network 450.

Orthogonality or independence between access radio network 440 and mesh radio network 450 may be accomplished, for example, by using different wireless technology for these two networks. For example, a cellular or GSM (Global System for Mobile Communication) wireless technology may be used for access radio network 440, while a WLAN or WiMAX (or other) wireless technology may be used for mesh radio network 450. For example, RN 407 may include two wireless transceivers, including a first cellular transceiver for communicating via the access radio network with MNs 403, 404, 405, etc., and a second WLAN or WIMAX transceiver for communicating with other RNs or AGs via mesh radio network 450. In another example embodiment, a same wireless technology may be used in both wireless networks 440 and 450, for example.

For example, by providing mesh radio network 450 that may have wireless media (or channels) orthogonal or separate from (or even using different wireless technology) access radio network 440, a legacy technology may be employed for mobile nodes (MNs) of network 440, while more advanced or newer technology may be used for mesh radio network 450 (e.g., for RNs and AGs). This may also allow protocols, rules, or other aspects of communication or technology for mesh radio network 450 to be independently changed and improved without creating incompatibility issues with existing handsets or mobile nodes (MNs), for example, although this is merely an example embodiment, and the disclosure is not limited thereto.

Figure 5:
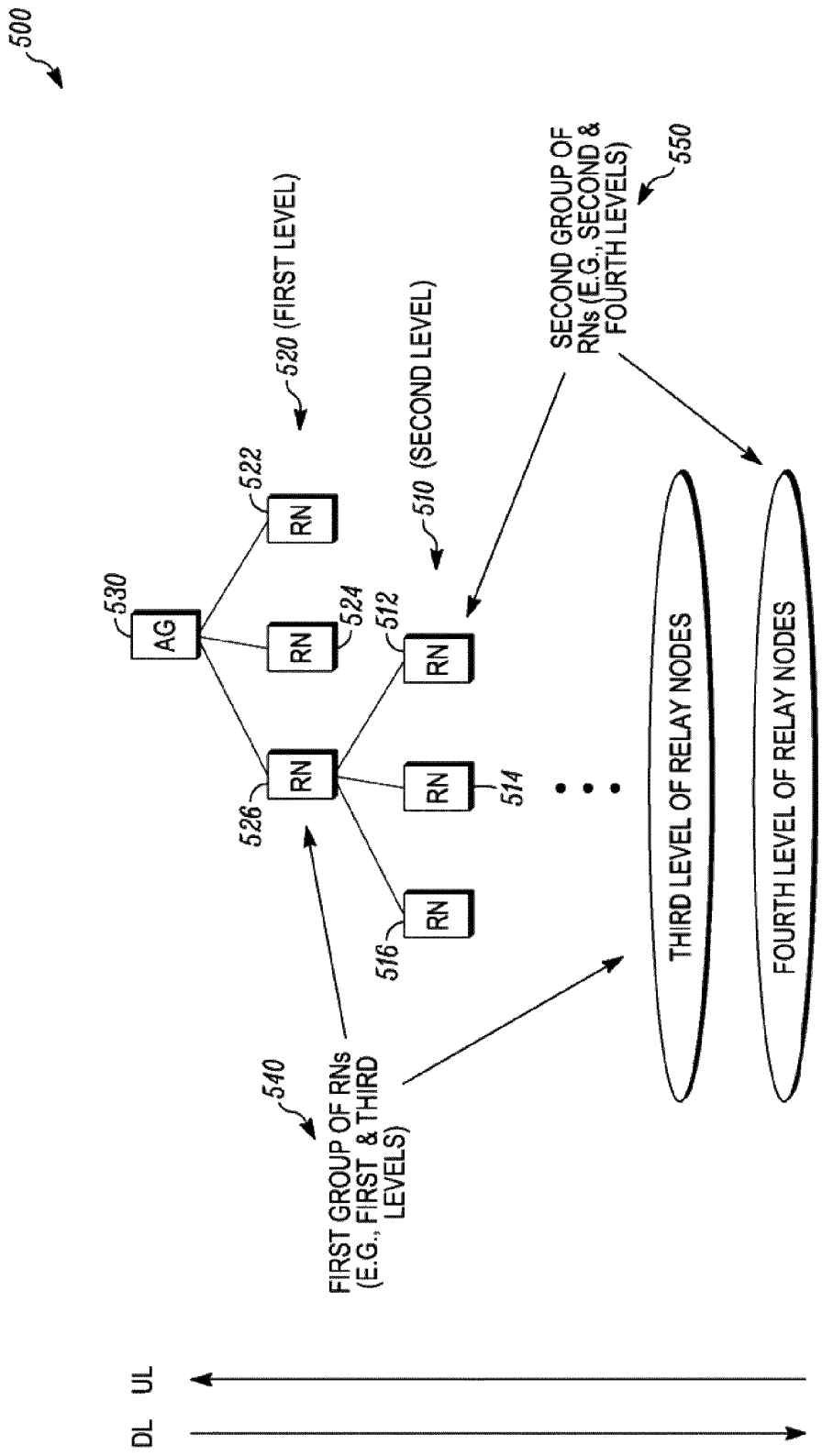
FIG. 5 is a diagram illustrating a tree structure for a wireless network according to an example embodiment.

FIG. 5 is a diagram illustrating a tree structure for a wireless network according to an example embodiment. Network 500, which may be a mesh network or relay network, may include an access gateway (AG) 530 and one or more levels of relay nodes. A level may, for example, refer to a number of hops that a RN may be from the AG, or a number of hops the RNs are from a MN, for example. Or, for example, RNs may be grouped together based on a number of hops they are from the AG, or a number of hops from a MN, etc. Although this is just an example, and any numbering system or numbering convention may be used to identify levels or groups of RNs. In this example, a first level (of RNs) 520 may include, for example, RNs 522, 524 and 526, and a second level of RNs may include RNs 512, 514 and 516, although any number of RNs may be provided at each level. In addition, as shown, the network 500 may include any number of levels of RNs, such as a third level of RNs, a fourth level of RNs, etc.

According to an example embodiment, the one or more RNs may operate in a time division duplex (TDD) manner, where each RN may transmit during a time slot or phase, e.g., as part of TDD or OFDMA or other modulation scheme. Each RN may typically either transmit or receive, but does not typically transmit and receive at the same time. Also, in an example embodiment, it may be desirable for adjacent RNs to avoid transmitting across a shared wireless media at the same time, which may cause collisions, interference, etc.

Therefore, according to an example embodiment, a technique may be provided to transmit data using a multi-phase operation. For example, referring to FIG. 5, a first group 540 of RNs may transmit, and a second group 550 may receive, during a first phase (or time slot), while the second group 550 of RNs may transmit and the first group 540 may receive during a second phase or time slot. This is merely an example. In this manner, during each phase, one group of the RNs (or nodes) is transmitting, and the other group is receiving. During another phase or time slots, roles may be reversed, allowing the group that was receiving to now transmit, and the group that was transmitting to now receive. Also, this division of transmission into phases may include separate phases for uplink and downlink transmission, where uplink may generally refer to a transmission towards the AG, while downlink may refer to a transmission away from the AG (e.g., towards a MN).

In addition, according to an example embodiment, the groups of wireless nodes (or RNs) may include alternate levels (or alternate rows) of nodes or RNs, to allow efficient use of the wireless media. For instance, a first group of RNs 540 may include rows 1 and 3, while a second group of RNs may include rows 2 and 4, for example. Other levels may also be included. The first group of nodes 540 may transmit during a first phase, while a second group 550 receives during the first phase. Similarly, during a second phase, the second group 550 may transmit while the first group 540 may receive.

Figure 6:
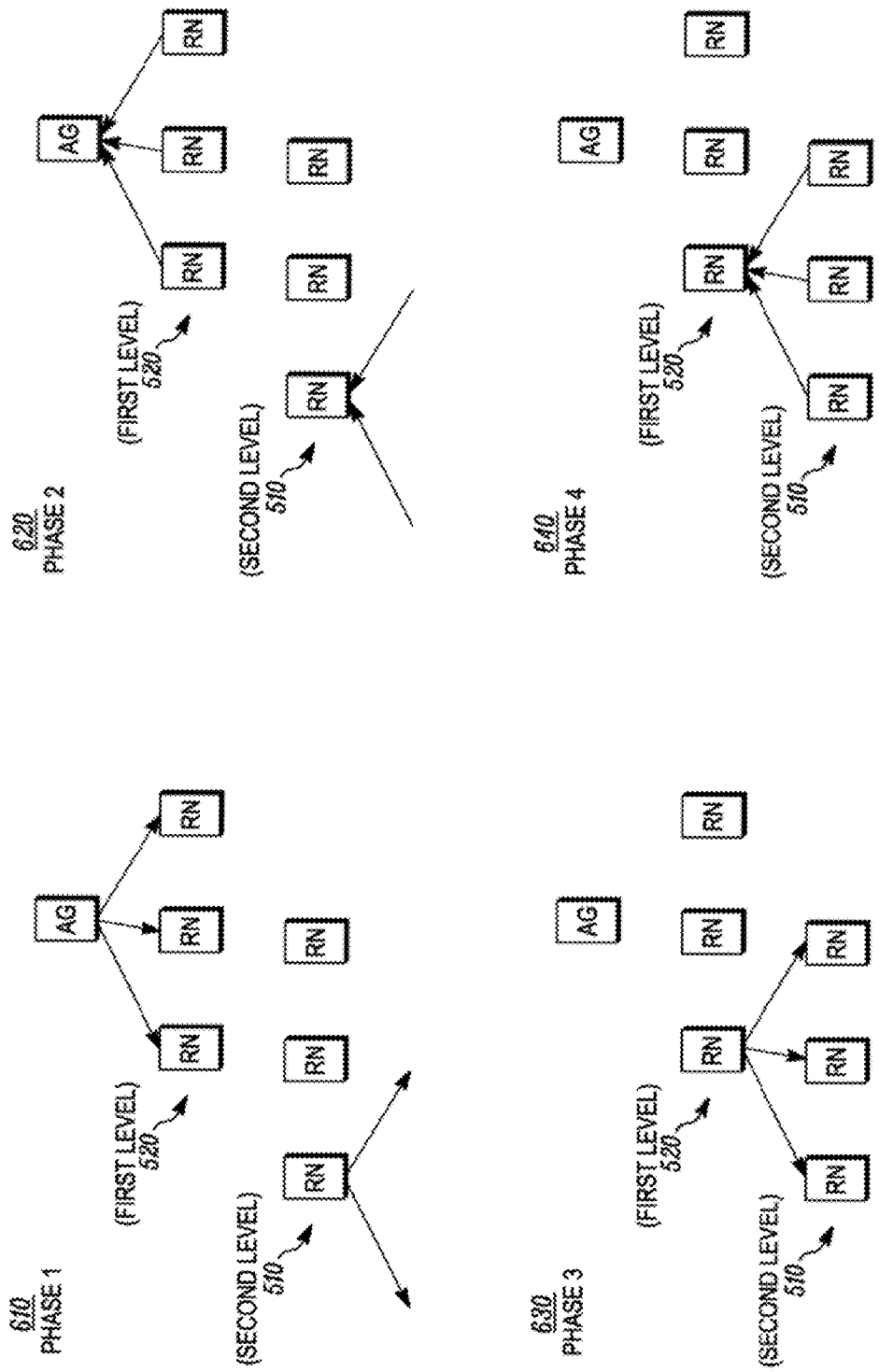
FIG. 6 is a diagram illustrating a 4-phase operation for transmission for a wireless network according to an example embodiment.

FIG. 6 is a diagram illustrating a 4-phase operation for transmission for a wireless network according to an example embodiment. The phases may include phase 1, phase 2, phase 3 and phase 4, as examples. In this example illustrated in FIG. 6, a first group of wireless nodes may be simplified as first level 520 (but may include other levels, such as a third level), and a second group of wireless nodes may be simplified as a second level 510 (and may include other levels of nodes or RNs, such as a fourth level). Resources (e.g., time slots or other resources) may be allocated to the different levels of nodes for the different phases as shown, e.g., in order to more efficiently use the wireless media. The media may be reserved or allocated to nodes or groups of nodes, or resources may be obtained based on a contention-based channel access, for example.

Referring to FIG. 6, at phase 1 610 (which may include a timeslot or group of timeslots), nodes of a first level 520 may receive frames (e.g., data frames, such as unicast, broadcast or multicast, and/or control frames, or other frames) in a downlink direction (from AG), while nodes of second level 510 may transmit frames (e.g., data frames, control frames, or other frames) in a downlink direction. Thus, during phase 1 610, one group of wireless nodes (e.g., first level 520) may receive frames in a downlink direction while another group (e.g., second level 510) may transmit frames in a downlink direction. A third level (not shown), if present, may be grouped with first level 520 and may receive in a downlink direction during phase 1610. A fourth level (not shown), if present, may be grouped with second level 510 and may transmit in a downlink direction during phase 1 610.

During phase 2 620 (which may include a timeslot or group of timeslots), a first level 520 of nodes may transmit in the uplink direction (e.g., to AG 530), while a second level 510 of nodes may receive in the uplink direction (e.g., from a third level, not shown). The third level (like the first level) may, if present, transmit in the uplink direction, and the fourth level (like the second level), if present, may receive in the uplink direction, for example (not shown).

During a third phase 630, the first level 520 (and third level, not shown) of nodes may transmit in the downlink direction, while the second level 510 (and fourth level) of nodes may receive in the downlink direction. Thus, in this example, during phase 3, the first level 520 may transmit (e.g., during one or more timeslots) downlink to the second level 510, the second level 510 may receive in a downlink direction from the first level 520, etc.

During phase 4 640, the first level 520 (and third level not shown) may receive in an uplink direction, and the second level 510 (and fourth level not shown) may transmit in an uplink direction.

According to an example embodiment, it may add additional delay for circuitry of a wireless node to switch from a receiving mode to transmitting mode, or to switch from a transmitting mode to a receive mode. Therefore, in an example embodiment, although not required, it may be beneficial (e.g., to reduce delay) to arrange the phases of operation to decrease a number of transmit-receive mode switchings. For example, although not required, the 4 phases may be arranged to perform two transmit phases, followed by two receive phases, followed by two transmit phases, etc., for each node. Thus, first level 520 of nodes may perform the following, according to phases 1-4: receive (DL), transmit (UL), transmit (DL), and receive (UL), and then repeat the 4 phases, where UL refers to uplink direction and DL refers to downlink direction. For the second level 510, the phases 1-4 may include, for example: transmit (DL), receive (UL), receive (DL), and transmit (UL), and then repeat. These are just some examples of how the order of phases may be arranged, although other orders may be used. Thus, in this example, the order for any node for the phases may be viewed as: T, T, R, R, T, T, R, R, T, T, ..., where T refers to transmit and R refers to receive. For example, the exact location of phase 1, phase 2, phase 3 and phase 4 in such a sequence may vary, based on where phase 1 is selected to begin.

Therefore, according to the example 4-phase operation, each node or RN may be provided an opportunity to transmit and receive both in the uplink and downlink directions. In an example embodiment, one or more of the nodes or RNs may include an ARQ (automatic repeat request), or other protocol, where the node may send an acknowledgement (ACK) to acknowledge successful receipt of data frames, and may send a negative acknowledgement (NACK) to indicate receipt of a corrupted frame or packet, thus indicating that the corrupted or incorrectly received frame or packet should be retransmitted. In addition to ACK and NACK frames, other control frames or control signals may be transmitted as well.

A number of applications may be sensitive to network delay. Also, the delay across a multi-hop network, such as a relay network or mesh network, may often be greater due to the higher number of hops. Therefore, it may be desirable to implement techniques where possible to decrease the delay for transmitting an ACK/NACK or for retransmitting a packet, e.g., to decrease network delay.

Referring to FIG. 6, in some cases, it may require 3 phases before a node may be able to transmit an ACK or NACK for a received frame. For example, in phase 4, first level 520 of nodes may receive in the uplink direction. However, first level 520 do not transmit downlink until the subsequent phase 3, which is 3 phases later. Also, first level 520 of nodes may receive in the downlink direction at phase 1, and may, at least in theory, be able to transmit an ACK/NACK in the uplink direction at phase 2, if the node has processed the received packet to determine if an ACK or NACK should be sent. In this case, there may not be sufficient time for first level node to receive and process the received data frame during phase 1 before transmitting an ACK/NACK or other control frame back to the AG 530 at phase 2. Rather, according to an example embodiment, a node may receive a frame during one phase, and may process that received frame during a next phase, e.g., while transmitting or receiving other frames. Therefore, in the example case where first level 520 may not have sufficient time to process the frame received in phase 1 before phase 2 begins, the first level 520 may wait 4 phases, until phase 2 again (of the next cycle of phases) before the first level node 520 will have an opportunity to transmit an ACK or NACK in the uplink direction to AG 530. Such a significant delay (e.g., 3 or 4 phases) before transmitting ACKs/NACKs or other control frames may be undesirable, at least for some applications.

Figure 7:
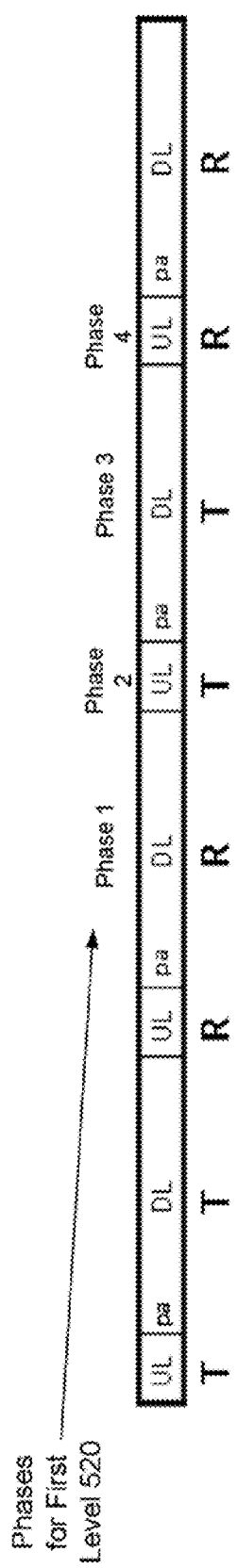
FIG. 7 is a diagram illustrating an allocation of uplink and downlink transmissions according to an example embodiment.

FIG. 7 is a diagram illustrating an allocation of uplink and downlink transmissions according to an example embodiment. According to an example embodiment, a mesh network or relay network (or other wireless network) may use OFDMA technology as an underlying physical layer and resource allocations may be made, for example, in time (e.g., time slots) and frequency (subcarriers). Also, different frequency hopping sequences may be used, etc. Other technologies may be used to allocate resources. A granularity of time slots may be one OFDMA symbol, for example. Separate time slots may be used for DL and UL traffic. DL and UL traffic may include time slots for each RN and for the whole network.

Referring to FIG. 7, downlink (DL) allocation may often be greater or longer than uplink (UL) allocation. The DL transmission may, for example, begin with a preamble (pa). When a node transmits, it may also process a packet or frame it previously received, for example. When a node is receiving, the node may also be pre-processing a frame or packet to be transmitted during a next phase. Example UL and DL allocations are shown in FIG. 7, e.g., for level 1 520 for phases 1-4. Phase 1 may include receiving frames in the DL direction. Phase 2 may include transmitting (or an opportunity to transmit) in the UL direction. Phase 3 may include transmitting (or an opportunity to transmit) in the DL direction. And, phase 4 for level 1 520 may include receiving in the UL direction, for example.

Figure 8:
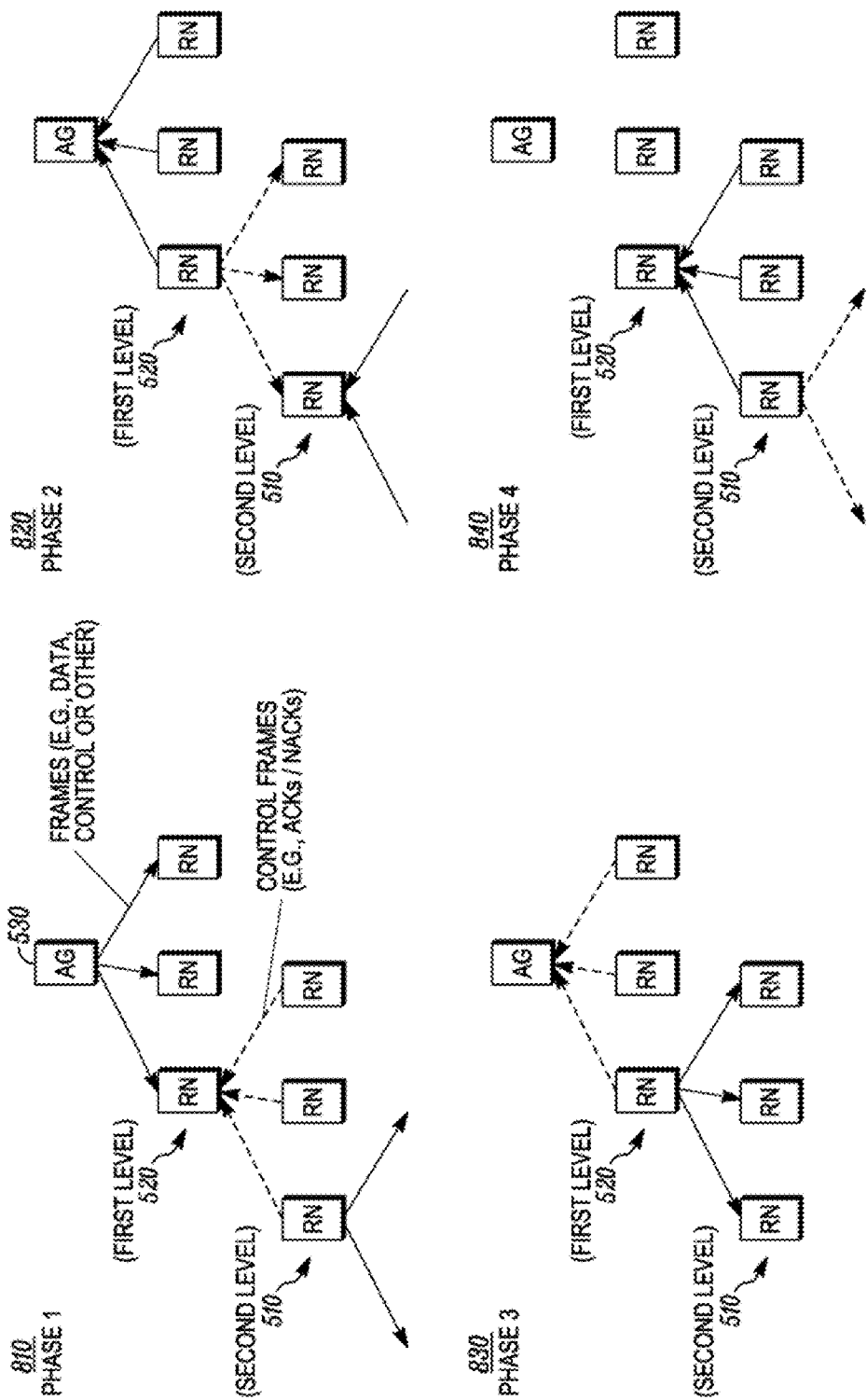
FIG. 8 is a diagram illustrating a 4-phase operation for transmission for a wireless network according to another example embodiment.

FIG. 8 is a diagram illustrating a 4-phase operation for transmission for a wireless network according to another example embodiment. According to an example embodiment, network delay (e.g., delays in sending ACKs/NACKs) may be decreased in the example 4-phase operation of FIG. 8, e.g., as compared to the 4-phase operation shown in FIG. 6.

According to an example embodiment, a node or RN may transmit frames (e.g., data frames and/or control frames) in a first direction and may transmit control frames or control messages (e.g., ACKs/NACKs) in a second direction during a first phase. Similarly, the node or RN may transmit frames (e.g., data frames and/or control frames) in the second direction and may transmit control frames (e.g., ACKs/NACKs) in the first direction during a second or other phase. For example, although not required, a dedicated control channel (e.g., separate subcarrier and/or time slot) may be allocated for the control frames (e.g., ACKs/NACKs). Or, for example, the node may transmit a data frame to a first node while transmitting an ACK/NACK (or other control frame) to a second node during a first phase. The first and second nodes may, for example, be located in different directions (e.g., a first node is upstream and the second node is downstream).

In an alternative embodiment, a RN or node may transmit a data frame to a first node and an ACK/NACK (or other control frame) to a second node during a particular phase (which may include one or more time slots), where the first and second nodes may be located in the same direction (e.g., both first and second nodes may be both upstream or both downstream).

In this manner, by allowing a node to transmit data or other frames, e.g., in a first direction and being permitted to transmit control frames (e.g., ACKs/NACKs), e.g., in a second direction during a same phase (e.g., timeslot or group of timeslots that are part of the phase), a faster acknowledgement or negative acknowledgement may be provided, which may decrease network delays.

The first and second directions may refer to uplink or downlink directions, or downlink and uplink directions. Transmitting in a particular direction (either UL or DL) does not necessarily mean that a directional antenna is used or a directional transmission is performed. Any kind of antenna may be used, such as omnidirectional antennas, directional antennas, or other antennas, etc. Rather, transmitting in an UL or DL direction may, for example, indicate that a frame is being transmitted or directed to a node that is located in a direction that may be UL (or upstream) or DL (or downstream) direction, for example. For example, transmitting in a DL direction may include transmitting (e.g., using a directional, omnidirectional or other antenna) a data frame to a mobile node (which is located downstream from the transmitting node). Similarly, transmitting in an UL direction may include transmitting a frame to an AG (which is located upstream from the transmitting node), although the frame may pass through one or more intermediate RNs before reaching the AG.

Referring to FIG. 8, the solid lines may indicate transmission (or permission to transmit) of frames (e.g., data frames, control frames, and/or other frames), while dashed lines may indicate transmission (or permission to transmit) control frames (e.g., ACKs/NACKs or other control signals).

At phase 1 810, second level 510 of nodes may transmit frames (e.g., data and/or control frames) in a DL direction indicated by the solid lines, while transmitting (or being permitted to transmit) control signals (e.g., ACKs/NACKs) in an UL direction indicated by the dashed line. Phase 1 (and the other phases) may include one or more channels or resources, such as multiple frequencies (subcarriers) and/or time slots, for example. For example, a dedicated resource or channel (e.g., subcarrier and/or time slot) may be provided for the transmission of control frames (e.g., ACKs/NACKs) for transmission of ACKs/NACKs. For example, second level nodes 510 may transmit a data frame in a DL direction (e.g, to a MN) using a first channel (e.g., a subcarrier and/or timeslot) while transmitting ACKs/NACK to AG (UL), during phase 1. For instance, different time slots may be used for data frames (solid lines) and ACKs/NACKs (dashed lines), or different subcarriers for the data and control frames may be used on the same time slot for phase 1. Thus, a dedicated control channel may be employed to transmit ACKs/NACKs, for example. AG 530 may also transmit DL during phase 1.

During phase 2 820 (e.g., which may include one or more time slots), second level 510 of nodes may receive data or other frames in an UL direction (e.g., from third level) and may receive control frames (e.g., ACKs/NACKs) in a DL direction from the first level 520. Also during phase 2, the first level 520 of relay nodes may transmit data or other frames in an UL direction and may transmit control frames in a DL direction.

During phase 3 830 (which may include one or more time slots), first level 520 may transmit data or other frames in a DL direction and may transmit control frames (e.g., ACKs/ NACKs) in an UL direction. Second level 510 nodes may receive data or other frames in a DL direction, and may also receive control frames in an UL direction from a third level (not shown) if present.

In phase 4 840, first level 520 may transmit data or other frames in an UL direction, and may transmit control frames (e.g., ACKs/NACKs) in a DL direction.

According to an example embodiment, the 4-phase operation illustrated in FIG. 8 may allow an efficient use of resources for a network, such as a relay network or mesh network, for example. A first level RN 520 may receive in a DL direction a data frame in phase 1 (from AG), may process or decode the received frame during phase 2 while transmitting other data or frames, and may forward the received data frame (that was received in phase 1), and then may forward the processed frame to second level 510 during phase 3. This may provide sufficient time for a node to process a received frame before forwarding the frame, but not provide too much delay between receipt and forwarding of the frame that would introduce unnecessary delay. This is merely an example embodiment, and other embodiments or examples may be used.

In addition, the 4-phase operation illustrated in FIG. 8 may allow a faster ARQ mechanism, e.g., as compared to the system illustrated in FIG. 6. For example, first level 520 may receive data frames in a DL direction in phase 1 810, and may transmit ACKs/NACKs in an UL direction during either phase 2 820 or phase 3 830. As noted, in some cases there may not be sufficient time for the node to receive and process a frame during phase 1, and then transmit an ACK NACK during phase 2 820. Therefore, allowing first level node 520 to transmit an ACK or NACK, e.g., on a dedicated control channel, in an UL direction during phase 3 830 may allow transmission of ACKs/NACKs up to 2 or 3 phases earlier, which may decrease network delay. Similarly, second level 510 may receive a data frame in a DL direction in phase 3, and may transmit an ACK/NACK in an UL direction in phase 3, e.g., on a dedicated control channel.

In addition, as shown in FIG. 8, the network may include a first group of nodes (e.g., second level 510) that may transmit data or other frames in a first direction and control frames in a second direction during a first phase, and transmit data frames in a second direction and control frames in a first direction during a fourth phase (e.g., second level 510 may transmit data frames in a DL direction and control frames in a UL direction during phase 1, and may transmit data frames in an UL direction and control frames in a DL direction during phase 4). The network may also include a second group of nodes (e.g., first level 520) that may transmit data frames in the second direction and control frames in the first direction during a second phase, and transmit data frames in the first direction and control frames in the second direction during a third phase (e.g., first level 520 may transmit data frames in an UL direction and control frames in a DL direction during phase 2, and may transmit data frames in a DL direction and control frames in an UL direction during phase 3).

According to an example embodiment, resources (e.g., different frequencies, time slots, hopping sequences, and the like) maybe reserved for one or more control channels to allow fast ACKs/NACKs to be transmitted. According to an example embodiment, only certain high priority applications may be permitted to use the fast control channels, such as Voice over IP (VoIP) applications, interactive games or other high priority applications that may be sensitive to network delay. For example, traffic having only certain high priority classes or Access Categories (ACs) may be permitted to use the dedicated control channel for ACKs/NACKs. In another example embodiment, the dedicated control channel(s) may be used only for NACKs, in order to decrease load or traffic through the high priority channels, for example.

Figure 9:
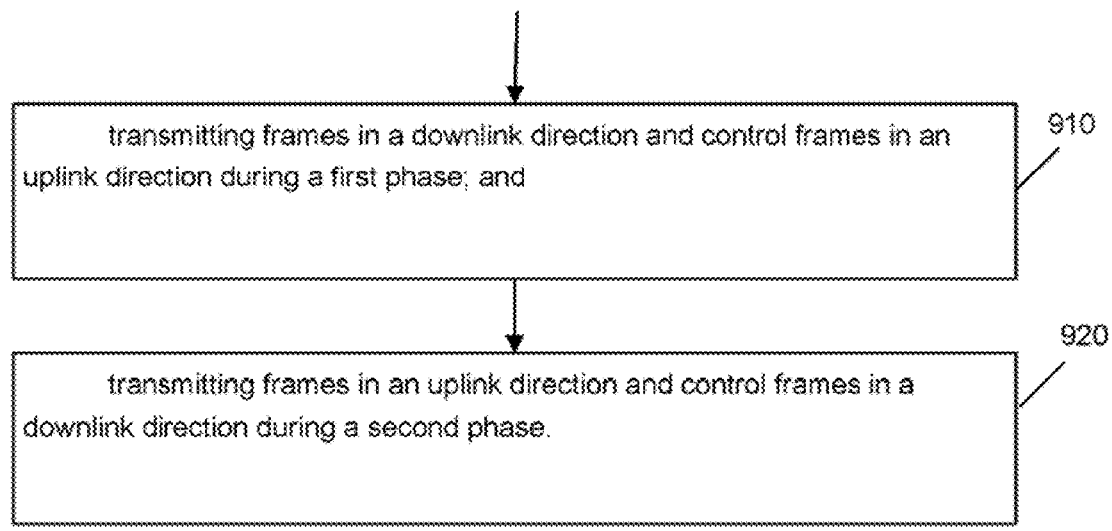
FIG. 9 is a flow chart illustrating operation of a node according to an example embodiment.

FIG. 9 is a flow chart illustrating operation of a node (e.g., relay node) according to an example embodiment. At 910, a frame (e.g., data frame) may be transmitted in a downlink direction and a control frame may be transmitted in an uplink direction during a first phase. At 920, a frame (e.g., data frame) may be transmitted in an uplink direction and a control frame may be transmitted in a downlink direction during a second phase.

Figure 10:
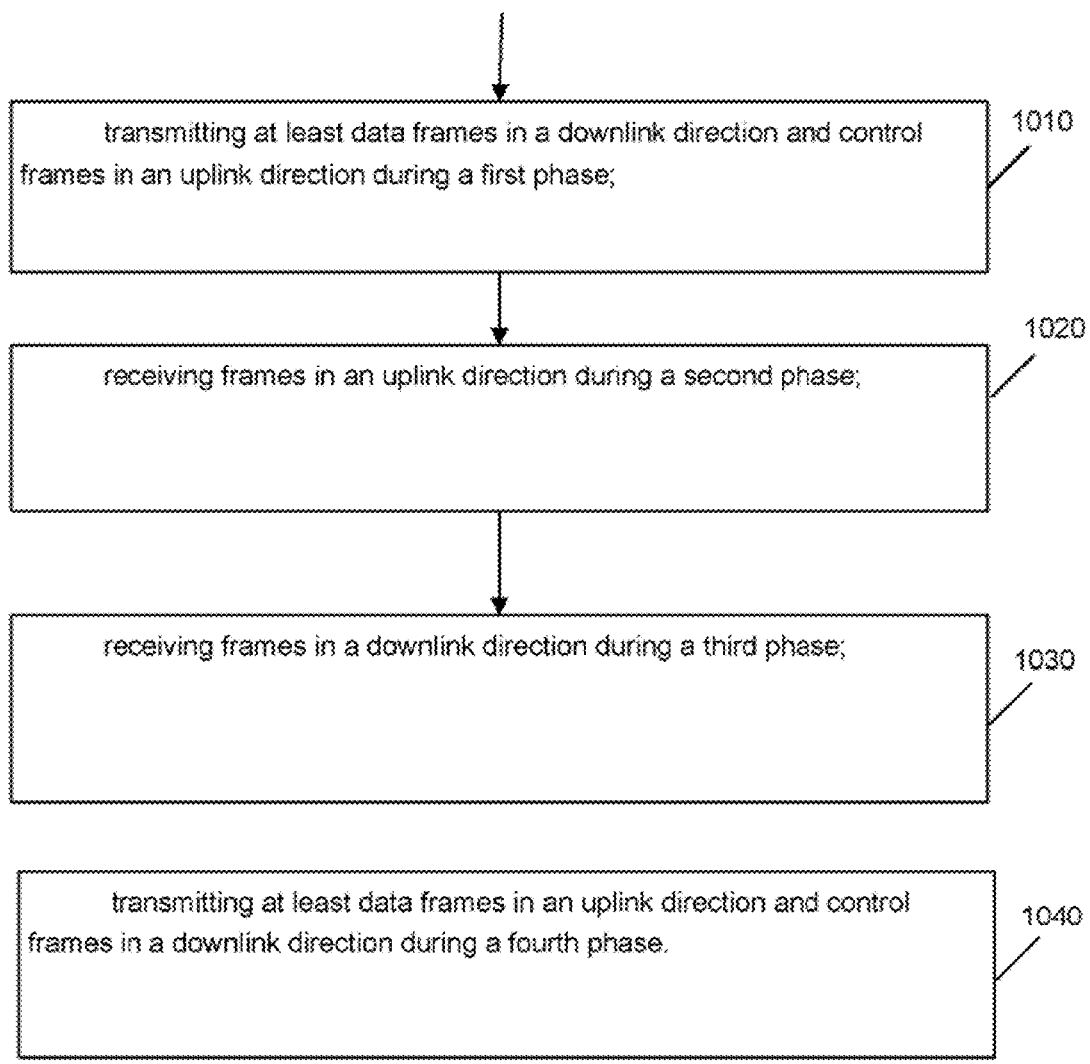
FIG. 10 is a flow chart illustrating operation of a node according to another example embodiment.

FIG. 10 is a flow chart illustrating operation of a node (e.g., a relay node) according to an example embodiment. At 1010, a data frame may be transmitted in a downlink direction and a control frame may be transmitted in an uplink direction during a first phase. At 1020, a frame may be received in an uplink direction during a second phase. Of course, control frames may be received in a downlink direction as well at 1020. At 1030, a frame may be received in a downlink direction during a third phase. In an example embodiment, control frames may also be received via an uplink direction during the third phase. At 1040, a data frame may be transmitted in an uplink direction and a control frame may be transmitted in a downlink direction during a fourth phase.

Figure 11:
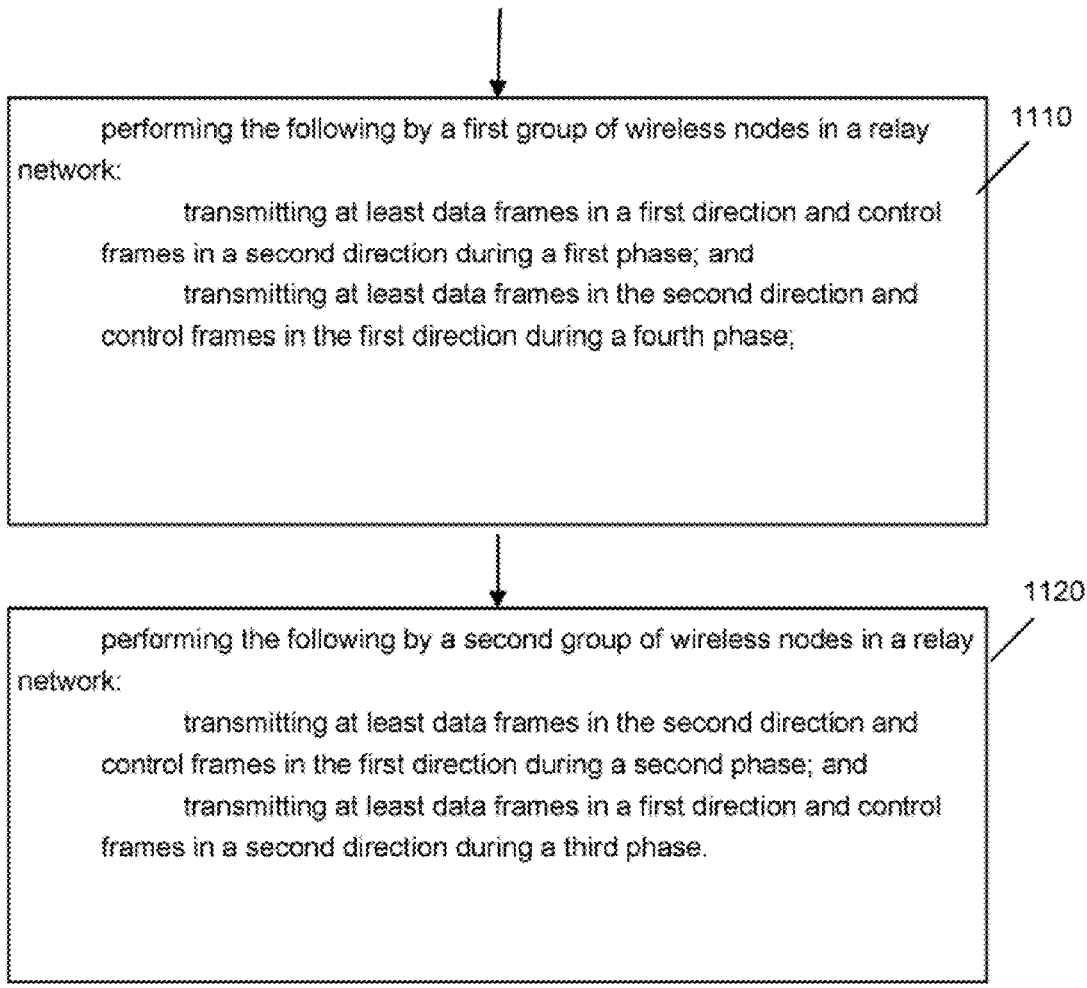
FIG. 11 is a flow chart illustrating operation of a node according to yet another example embodiment.

FIG. 11 is a flow chart illustrating operation of a node (e.g., a relay node) according to an example embodiment.

At 1110, a first group of nodes (e.g., second level 510) may transmit data or other frames in a first direction and control frames in a second direction during a first phase, and transmit data frames in the second direction and control frames in the first direction during a fourth phase (e.g., second level 510 may transmit data frames in a DL direction and control frames in a UL direction during phase 1, and may transmit data frames in an UL direction and control frames in a DL direction during phase 4).

At 1120, a second group of nodes (e.g., first level 520) that may transmit data frames in the second direction and control frames in the first direction during a second phase, and transmit data frames in the first direction and control frames in the second direction during a third phase (e.g., first level 520 may transmit data frames in an UL direction and control frames in a DL direction during phase 2, and may transmit data frames in a DL direction and control frames in an UL direction during phase 3).

Figure 12:
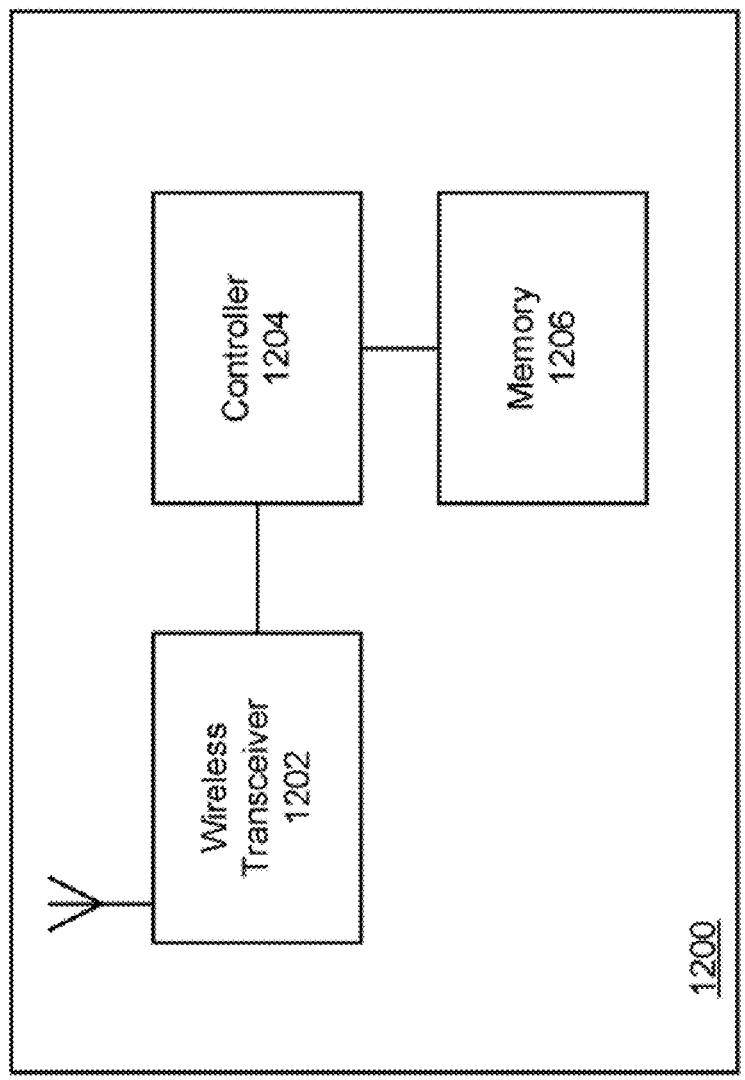
FIG. 12 is a block diagram illustrating an apparatus that may be provided in a wireless node according to an example embodiment.

FIG. 12 is a block diagram illustrating an apparatus 1200 that may be provided in a wireless node according to an example embodiment. The wireless node (e.g. station or AP) may include, for example, a wireless transceiver 1202 to transmit and receive signals, a controller 1204 to control operation of the station and execute instructions or software, and a memory 1206 to store data and/or instructions.

Controller 1204 may be programmable and capable of executing software or other instructions stored in memory or on other computer media to perform the various tasks and functions described above, such as one or more the tasks or methods described above.

In addition, a storage medium may be provided that includes stored instructions, when executed by a controller or processor that may result in the controller 1204, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art.

The invention claimed is:

1. A method of transmitting and receiving data using a multi-phase operation comprising:
   transmitting at least data frames in a downlink direction and control frames in an uplink direction during a first phase;
   receiving frames in an uplink direction during a second phase;
   receiving frames in a downlink direction during a third phase; and
   transmitting at least data frames in an uplink direction and control frames in a downlink direction during a fourth phase.

2. The method of claim 1 wherein a phase comprises a time slot.

3. The method of claim 1 and further comprising receiving an uplink/downlink split message indicating a number or ratio of the length of or amount of subframes of uplink and downlink phases.

4. The method of claim 1 wherein the method comprises:
   performing the following by a first group of wireless nodes in a relay network:
      transmitting at least data frames in a first direction and control frames in a second direction during a first phase; and
      transmitting at least data frames in the second direction and control frames in the first direction during a fourth phase; and
   performing the following by a second group of wireless nodes in a relay network:
      transmitting at least data frames in the second direction and control frames in the first direction during a second phase; and
      transmitting at least data frames in a first direction and control frames in a second direction during a third phase.

5. The method of claim 1 wherein the first direction comprises a downlink direction and the second direction comprises an uplink direction.

6. The method of claim 1 wherein the second direction comprises a downlink direction and the first direction comprises an uplink direction.

7. An apparatus for wireless communication, the apparatus comprising:
a controller;
a memory coupled to the controller; and
a wireless transceiver coupled to the controller;
the apparatus configured to:
transmit at least data frames in a first direction and control frames in a second direction during a first phase;
receive frames in the second direction during a second phase;
receive frames in the first direction during a third phase; and
transmit at least data frames in the second direction and control frames in the first direction during a fourth phase.

8. The apparatus of claim 7, wherein the apparatus comprises a first wireless transceiver for transmitting on subcarriers or frequencies in the downlink direction, and a second wireless transceiver for transmitting on subcarriers or frequencies in the uplink direction.

9. The apparatus of claim 7, wherein the first direction comprises a downlink direction and the second direction comprises an uplink direction.

10. The apparatus of claim 7, wherein the second direction comprises a downlink direction and the first direction comprises an uplink direction.

* * * * *